United States Patent
You et al.

(10) Patent No.: US 10,760,906 B2
(45) Date of Patent: Sep. 1, 2020

(54) APPARATUS AND METHOD FOR OBTAINING THREE-DIMENSIONAL DEPTH IMAGE

(71) Applicant: SAMSUNG ELECTRONICS CO., LTD., Suwon-si (KR)

(72) Inventors: Jangwoo You, Osan-si (KR); Yonghwa Park, Seoul (KR); Heesun Yoon, Seoul (KR); Myungjae Jeon, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 757 days.

(21) Appl. No.: 15/081,407

(22) Filed: Mar. 25, 2016

(65) Prior Publication Data

US 2017/0122731 A1     May 4, 2017

(30) Foreign Application Priority Data

Oct. 29, 2015  (KR) .................. 10-2015-0151103

(51) Int. Cl.
| | |
|---|---|
| *G01C 3/08* | (2006.01) |
| *G01S 17/89* | (2020.01) |
| *G01S 7/481* | (2006.01) |
| *G01S 17/36* | (2006.01) |

(52) U.S. Cl.
CPC ............. *G01C 3/08* (2013.01); *G01S 7/4815* (2013.01); *G01S 17/36* (2013.01); *G01S 17/89* (2013.01)

(58) Field of Classification Search
None
See application file for complete search history.

(56) References Cited

U.S. PATENT DOCUMENTS

| 7,935,928 B2 | 5/2011 | Seger et al. |
| 2007/0181810 A1 | 8/2007 | Tan et al. |
| 2012/0147147 A1 | 6/2012 | Park et al. |

(Continued)

FOREIGN PATENT DOCUMENTS

| CN | 103079085 A | 5/2013 |
| CN | 104104941 A | 10/2014 |

(Continued)

OTHER PUBLICATIONS

Kota Ito et al., "System Design and Performance Characterization of a MEMS-Based Laser Scanning Time-of-Flight Sensor Based on a 256×64-pixel Single-Photon Imager", IEEE Photonics Journal, Apr. 2013, vol. 5, No. 2, 15 pages, XP011510713.

(Continued)

*Primary Examiner* — Mohammed Jebari
(74) *Attorney, Agent, or Firm* — Sughrue Mion, PLLC (57) ABSTRACT

An apparatus and method for obtaining a depth image are provided. The apparatus may include a light source configured to emit first light to a first region of an object for a first time period and emit second light to a second region of the object for a second time period, the first light and the second light respectively being reflected from the first region and the second region; and an image obtainer configured to obtain a first partial depth image based on the reflected first light, obtain a second partial depth image based on the reflected second light, and obtain a first depth image of the object based on the first partial depth image and the second partial depth image.

27 Claims, 9 Drawing Sheets

(56) References Cited

U.S. PATENT DOCUMENTS

| | | | |
|---|---|---|---|
| 2012/0162197 A1* | 6/2012 | Park | G01S 17/89 345/419 |
| 2013/0101176 A1 | 4/2013 | Park et al. | |
| 2013/0321584 A1 | 12/2013 | Choi | |
| 2014/0055771 A1* | 2/2014 | Oggier | G01S 17/89 356/5.01 |
| 2014/0300701 A1 | 10/2014 | Park et al. | |
| 2015/0260830 A1* | 9/2015 | Ghosh | G01S 7/484 250/208.1 |
| 2016/0065942 A1* | 3/2016 | Park | H04N 13/254 348/46 |

FOREIGN PATENT DOCUMENTS

| | | |
|---|---|---|
| EP | 2275833 A1 | 1/2011 |
| EP | 2790034 A1 | 10/2014 |
| JP | 2005331273 A | 12/2005 |
| JP | 201350310 A | 3/2013 |
| KR | 1020120066499 A | 6/2012 |
| KR | 1020130136872 A | 12/2013 |

OTHER PUBLICATIONS

Communication dated Mar. 29, 2017 by the European Patent Office in counterpart European Patent Application No. 16172379.6.
Communication dated Sep. 30, 2019 issued by the State Intellectual Property Office of P.R. China in counterpart Chinese Patent Application No. 201610796927.X.

\* cited by examiner

APPARATUS AND METHOD FOR OBTAINING THREE-DIMENSIONAL DEPTH IMAGE

CROSS-REFERENCE TO RELATED APPLICATION

This application claims priority from Korean Patent Application No. 10-2015-0151103, filed on Oct. 29, 2015 in the Korean Intellectual Property Office, the disclosure of which is incorporated herein by reference in its entirety.

BACKGROUND

1. Field

Apparatuses and methods consistent with exemplary embodiments relate to obtaining depth images.

2. Description of the Related Art

In order to obtain a depth image of a subject, a time-of-flight (ToF) method may be used to measure the time taken for light (e.g., infrared light) to travel a distance from a viewpoint to the subject. A ToF depth camera using such a ToF method may obtain depth information of a subject in all pixels in real time, unlike other cameras for obtaining a depth image of a subject, such as a stereo camera or a structured light camera.

In a ToF method, a depth image may be obtained by using a phase difference between light emitted to a subject and light reflected from the subject.

SUMMARY

One or more exemplary embodiments provide apparatuses and methods of obtaining depth images with reduced motion blur.

Further, one or more exemplary embodiments provide apparatuses and methods of obtaining images that may increase frame rates of depth images.

According to an aspect of an exemplary embodiment, there is provided an apparatus for obtaining an image including: a light source configured to emit first light to a first region of an object for a first time period and emit second light to a second region of the object for a second time period, the first light and the second light respectively being reflected from the first region and the second region; and an image obtainer configured to obtain a first partial depth image based on the reflected first light, obtain a second partial depth image based on the reflected second light, and obtain a first depth image of the object based on the first partial depth image and the second partial depth image.

At least parts of the first time period and the second time period may not overlap each other.

The second time period may be subsequent to the first time period.

The first time period may be less than a reciprocal of a reference frame rate of an image sensor included in the image obtainer.

The first time period may be less than or equal to a value obtained by multiplying a ratio of the first region to the object by a reciprocal of a reference frame rate.

An amount of the first light emitted to the first region may be greater than a reference amount of light.

The amount of the first light emitted to the first region may be greater than or equal to a value obtained by multiplying a ratio of the object to the first region by the reference amount of light.

At least parts of the first region and the second region may not overlap each other.

The first region may be an upper region of the object, and the second region may be a lower region of the object.

The first light emitted from the light source may include a plurality of pieces of light with different phases.

A phase difference between adjacent two pieces of light from among the plurality of pieces of light may be 90°.

The first partial depth image may be obtained from a plurality of partial images with different phases.

The light source may be further configured to emit third light to the first region of the object for a third time period, the third light being reflected from the first region, and the image obtainer may be further configured to obtain a third partial depth image of the first region based on the reflected third light, and may obtain a second depth image of the object based on the second partial depth image and the third partial depth image.

At least parts of the second time period and the third time period may not overlap each other.

The third time period may be subsequent to the second time period.

A time interval may exist between the second time period and the third time period.

The image obtainer may include: an image sensor configured to obtain a plurality of first partial images based on the first light reflected from the first region and to obtain a plurality of second partial images based on the second light reflected from the second region; and a processor configured to obtain the first partial depth image from the plurality of first partial images, obtain the second partial depth image from the plurality of second partial images, and obtain the first depth image of the object based on the first partial depth image and the second partial depth image.

The image sensor may further configured to modulate a plurality of pieces of the reflected first light into signals with different gain waveforms.

According to an aspect of another exemplary embodiment, there is provided a method of obtaining an image including: emitting first light to a first region of an object for a first time period, the first light being reflected from the first region; emitting second light to a second region of the object for a second time period, the second light being reflected from the second region; obtaining a first partial depth image based on the reflected first light; obtaining a second partial depth image based on the reflected second light; and obtaining a first depth image of the object based on the first partial depth image and the second partial depth image.

At least parts of the first time period and the second time period may not overlap each other.

The second time period may be subsequent to the first time period.

The first time period may be less than a reciprocal of a reference frame rate of an image sensor configured to receive the reflected first light and the reflected second light.

The first time period may be less than or equal to a value obtained by multiplying a ratio of the first region to the object by the reciprocal of the reference frame rate.

An amount of the light emitted to the first region may be greater than a reference amount of light.

The amount of the light emitted to the first region may be greater than or equal to a value obtained by multiplying a ratio of the object to the first region by the reference amount of light.

At least parts of the first region and the second region may not overlap each other.

The first region may be an upper region of the object and the second region may be a lower region of the object.

The emitting the first light may include emitting a plurality of pieces of the first light to the first region, and the plurality of pieces of the first light may have different phases from each other.

A phase difference between adjacent two pieces of light from among the plurality of pieces of light may be 90°.

The method may further include: emitting third light to the first region of the object for a third time period, the third light being reflected from the first region; obtaining a third partial depth image of the first region based on the reflected third light reflected; and obtaining a second depth image of the object based on the second partial depth image and the third partial depth image.

At least parts of the second time period and the third time period may not overlap each other.

The third time period may be a time interval next to the second time period.

A time interval exists between the second time period and the third time period.

According to an aspect of another exemplary embodiment, there is provided a method of obtaining an image by a depth image sensor, the method including: alternately emitting light to each of a plurality of regions of an object with a predetermined time period, the light being reflected from each of the plurality of regions; repeatedly obtaining a partial depth image based on the reflected light when each of the predetermined time period ends; and generating a depth image of the object based on the partial depth image obtained while the predetermined time period occurs k number of times to collect the reflected light from all of the plurality of regions of the object, k corresponding to a number of the plurality of regions of the object.

BRIEF DESCRIPTION OF THE DRAWINGS

The above and/or other aspects will be more apparent by describing certain exemplary embodiments, with reference to the accompanying drawings, in which.

DETAILED DESCRIPTION

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

Figure 1:
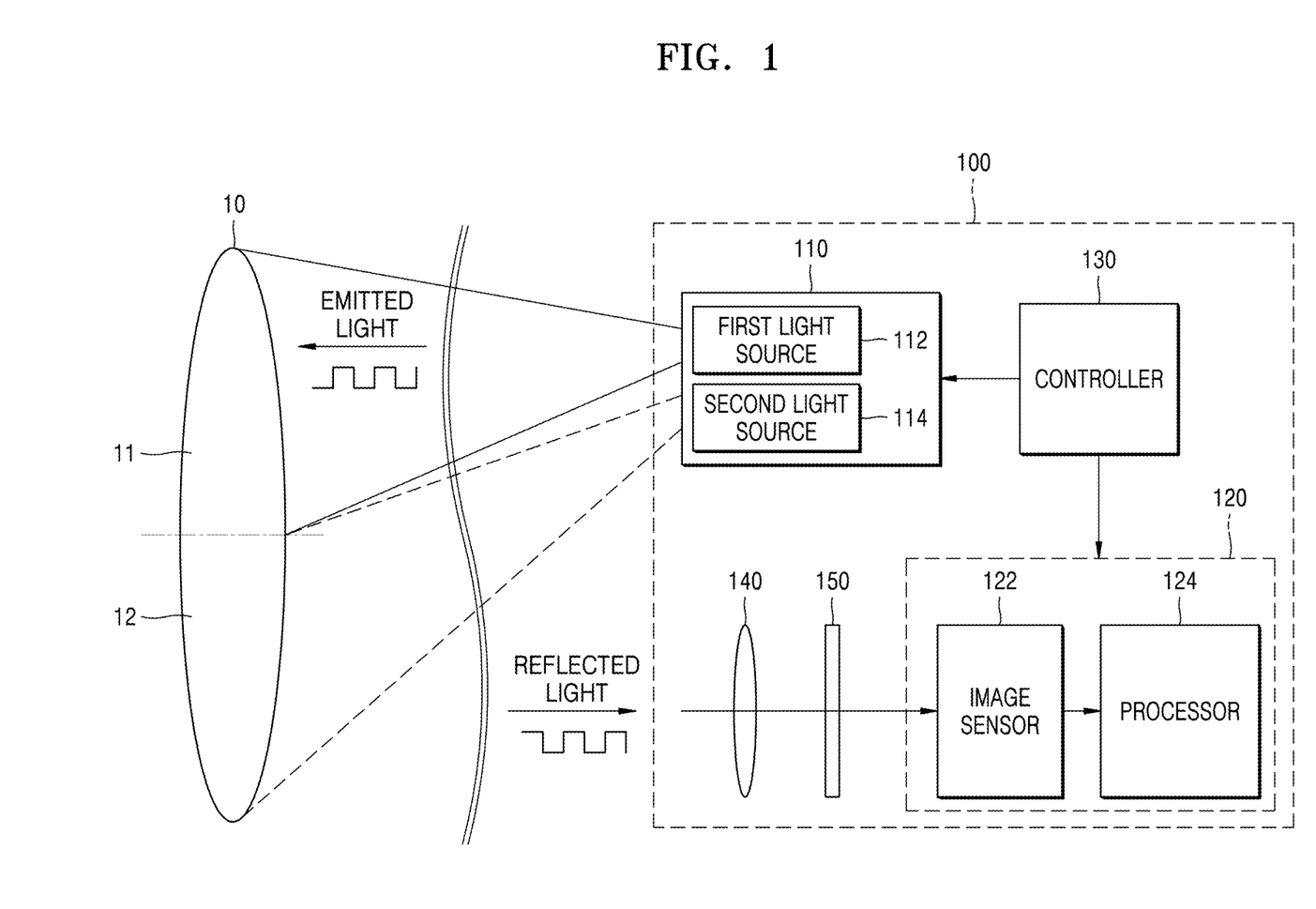
FIG. 1 is a block diagram of an apparatus for obtaining an image, according to an exemplary embodiment.

FIG. 1 is a block diagram of an apparatus (e.g., camera) 100 for obtaining an image according to an exemplary embodiment. Referring to FIG. 1, the apparatus 100 may include a light source 110 configured to emit light to an object 10, an image obtainer 120 configured to obtain a depth image of the object 10 by using light reflected from the object 10, and a controller 130 configured to control operations of the light source 110 and the image obtainer 120.

Also, the apparatus 100 may further include a first lens 140 configured to collect reflected light to obtain an image and a filter 150 configured to selectively transmit light having a predetermined wavelength and remove background light or stray light.

The light source 110 may be, for example, a light-emitting diode (LED) or a laser diode (LD) that may emit light having a near-infrared (NIR) wavelength of about 850 nm that is not seen by the human eye. However, a wavelength band and a type of the light source 110 are not limited.

The object 10 may have a plurality of regions and the light source 110 may sequentially emit light to the divided regions at time intervals. For example, the light source 110 may emit light to a first region 11 of the object 10 for a first time period, and may emit light to a second region 12 of the object 10 for a second time period. At least parts of the first region 11 and the second region 12 may not overlap each other. The first region 11 may be an upper region of the object 10 and the second region 12 may be a lower region of the object 10. Also, at least parts of the first time period and the second time period may not overlap each other. For example, the second time period may be a time interval subsequent to the first time period.

Alternatively, the light source 110 may include a first light source 112 configured to emit light to the first region 11 of the object 10 and a second light source 114 configured to emit light to the second region 12 of the object 10. Hence, the first and second light sources 112 and 114 may be switched on or off to alternately emit light according to a control signal of the controller 130. For example, the first light source 112 may be switched on to emit light for the first time period and the second light source 114 may be switched on to emit light for the second time period. The first light source 112 may be turned off for the second time period, and the second light source 114 may be turned off for the first time period.

The light source 110 may perform, for example, amplitude modulation or phase modulation and may output resultant light according to a control signal of the controller 130. A light emission signal applied from the light source 110 to the object 10 according to a control signal of the controller 130 may be a periodic continuous function with a predetermined period. For example, the light emission signal may have a specially defined waveform such as a sine waveform, a ramp waveform, or a square waveform, or may have a general waveform that is not defined.

The image obtainer 120 may include an image sensor 122 configured to receive light reflected from the object 10 and to obtain an image and a processor 124 configured to obtain a depth image including depth information of the object 10 from the image.

The image sensor 122 modulates light reflected from the object 10 according to a control signal received from the controller 130. For example, the image sensor 122 may modulate an amplitude of reflected light by changing a gain according to a light modulation signal with a predetermined waveform applied from the controller 130. To this end, the image sensor 122 has a variable gain.

The image sensor 122 may operate at a high light modulation speed of tens to hundreds of MHz in order to detect a travel time or a phase difference of light according to a distance. Examples of the image sensor 122 may include a phase image intensifier including a multi-channel plate (MCP), a GaAs-based solid-state modulator element, and a thin modulator element using an electroptic material The image sensor 122 may obtain an image from detected reflected light. If only a distance to one point of the object 10 is to be measured, the image sensor 122 may include, for example, a single light sensor such as a photodiode or an integrator. However, if distances to a plurality of points of the object 10 are to be simultaneously measured, the image sensor 122 may include a two-dimensional (2D) or one-dimensional (1D) array of photodiodes or light detectors. For example, the image sensor 122 may be a charge-coupled device (CCD) image sensor or a contact image sensor (CIS) including a 2D array.

The image sensor 122 may divide pixels into pixels of a plurality of regions according to a control signal of the controller 130. The divided regions of the image sensor 122 may correspond to divided regions of the light source 110. For example, when the light source 110 divides the object 10 into an upper region and a lower region, the controller 130 may divide pixels of the image sensor 122 into pixels of the upper region and pixels of the lower region.

The controller 130 may synchronize the light source 110 with the image sensor 122. In detail, the controller 130 may control the image sensor 122 so that a region of the image sensor 122 corresponding to the first region 11 operates when the light source 110 emits light to the first region 11. The controller 130 may control the image sensor 122 so that a region of the image sensor 122 corresponding to the second region 12 operates when the light source 110 emits light to the second region 12 of the object 10.

For example, when the light source 110 emits light to an upper region of the object 10, an upper region of the image sensor 122 may receive light reflected from the upper region of the object 10. When the light source 110 emits light to a lower region of the object 10, a lower region of the image sensor 122 may receive light reflected from the lower region of the object 10.

The processor 124 may obtain a depth image based on an output of the image sensor 122. The processor 124 may obtain a first partial depth image based on an output of the image sensor 122 corresponding to the first region 11 of the object 10, and may obtain a second partial depth image based on an output of the image sensor 122 corresponding to the second region 12 of the object 10. The processor 124 may generate a depth image (e.g., depth map) by using the first partial depth image and the second partial depth image. The depth image may be obtained by combining the first and second partial depth images based on coordinate information of the image sensor 122. The depth image may include information about a distance of a surface of the object 10 from the light source 110.

The processor 124 may be, for example, a specific integrated circuit (IC), or software provided in the apparatus 100. When the processor 124 is software, the processor 124 may be stored in an additional movable storage medium.

Figure 2:
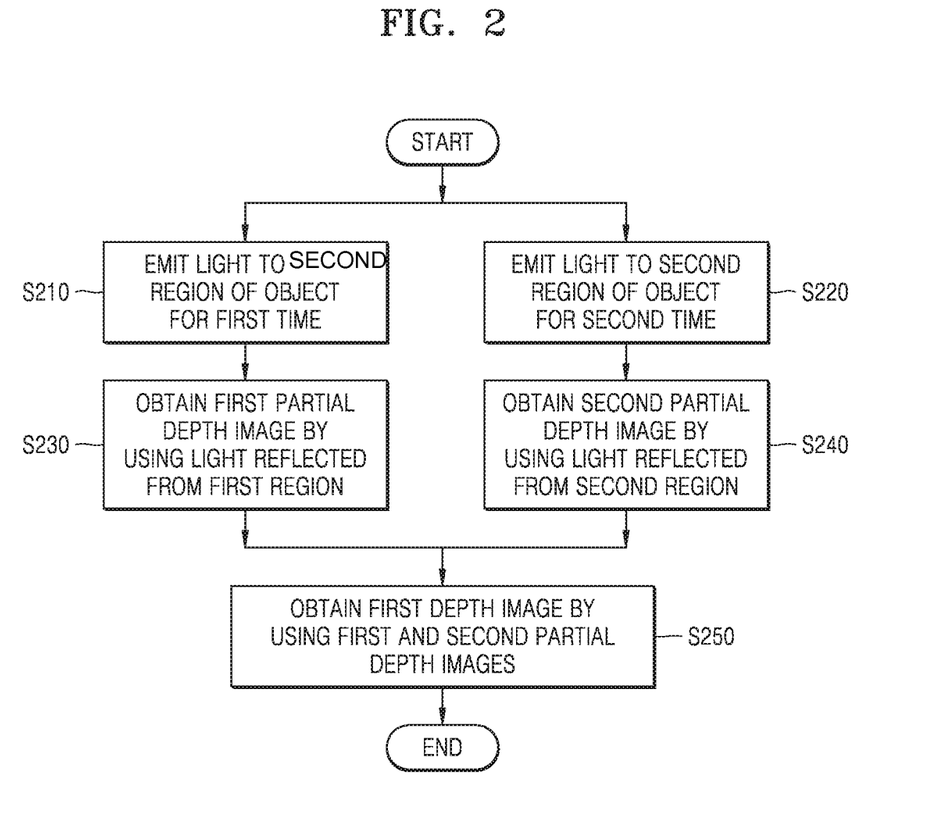
FIG. 2 is a flowchart of a method of obtaining a depth image, according to an exemplary embodiment.

FIG. 2 is a flowchart of a method of obtaining a depth image according to an exemplary embodiment. Referring to FIG. 2, in operation S210, the light source 110 may emit light to the first region 11 of the object 10 for a first time period. When the light source 110 includes the first and second light sources 112 and 114, the first light source 112 may emit light to the first region 11 of the object 10. However, the present exemplary embodiment is not limited thereto. The light source 110 may emit light to the first region 11 of the object 10 by adjusting an illumination angle. The first region 11 may be a region of the object 10, and may be, for example, an upper region of the object 10.

First, the light source 110 may sequentially emit a plurality of pieces of light with predetermined periods and predetermined waveforms to the first region 11 of the object 10 under the control of the controller 130. The plurality of pieces of light with the predetermined periods and the predetermined waveforms may be different from one another. The light source 110 may continuously and sequentially emit the plurality of pieces of light, or may sequentially emit the plurality of pieces of light at predetermined intervals.

For example, when four different pieces of light are used, the light source 110 may generate first light for a time t1 and emit the first light to the first region 11 of the object 10, may generate second light for a time t2 and emit the second light to the first region 11 of the object 10, may generate third light for a time t3 and emit the third light to the first region 11 of the object 10, and may generate fourth light for a time t4 and emit the fourth light to the first region 11 of the object 10. The first through fourth lights may be sequentially emitted to the first region 11 of the object 10. Each of the first through fourth lights may have a continuous function with a specific period such as a sine waveform or a pulse waveform. For example, the first through fourth lights may be periodic waves with the same period, the same waveform, and different phases.

When a plurality of pieces of light, for example, n pieces of light, are used, a phase difference between adjacent pieces of light may be 360°/n, and a period of each light may be less than an operation time of the light source 110. All of the n pieces of light may be sequentially emitted to the first region 11 of the object 10 within the operation time of the light source 110.

Since the light source 110 emits light to a region of the object 10, an amount of the emitted light may be greater than a reference amount of light. The reference amount of light may refer to an average minimum amount of light that the entire image sensor 122 may use to generate one frame image. Since the light source 110 emits light to a region of the object 10 and does not emit to remaining regions of the object 10, an amount of light is greater than the reference amount of light, and thus an average amount of light for the object 10 may be the reference amount of light. For example, when the light source 110 emits light to a 1/N (N is a natural number equal to or greater than 2) region, the light source 110 may emit light that has an amount which is N times greater than the reference amount of light. Alternatively, when the light source 110 discontinuously emits light, the light source 110 may emit light that has an amount which is N times or more as great as the reference amount of light.

Also, the first time period may be less than a reciprocal of a reference frame rate of the image sensor 122. The reciprocal of the reference frame rate refers to a time taken for the image sensor 122 to generate one frame image. Since the light source 110 emits light to a region of the object 10 and the image sensor 122 receives light reflected from the region of the object 10, the first time period is less than the reciprocal of the reference frame rate. For example, when the light source 110 emits light to a 1/N (N is a natural number equal to or greater than 2) region of the object 10, the light source 110 may emit light for a time obtained by multiplying 1/N by the reciprocal of the reference frame rate, and the image sensor 110 may receive light for a time obtained by multiplying 1/N by the reciprocal of the reference frame rate. Alternatively, when light is discontinuously emitted to the first region 11 of the object 10, the light may be emitted to the first region 11 of the object 10 for a time that is shorter than a time obtained by multiplying 1/N by the reciprocal of the reference frame rate.

Also, in operation S220, the light source 110 may emit light to the second region 12 of the object 10 for a second time period. When the light source 110 includes the first and second light sources 112 and 114, the second light source 114 may emit light to the second region 12 of the object 10. However, the present exemplary embodiment is not limited thereto. The light source 110 may emit light to the second region 12 of the object 10 by changing an illumination angle. The light source 110 may adjust the illumination angle so that the emitted light travels toward the first region 11 and the second region 12 alternately. The second region 12 may be a region of the object 10 and the size of the second region 12 may be equal to the size of the first region 11. Also, at least parts of the second region 12 and the first region 11 may not overlap each other. For example, the second region 12 may be a lower region.

The light source 110 may sequentially emit a plurality of pieces of light with predetermined periods and predetermined waveforms to the second region 12 of the object 10 under the control of the controller 130. The plurality of pieces of light with the predetermined periods and the predetermined waveforms may be different from one another. The light source 110 may continuously and sequentially emit the plurality of pieces of light or may sequentially emit the plurality of pieces of light at predetermined intervals.

At least parts of the second time period and the first time period may not overlap each other. For example, the second time period may be a time interval subsequent to the first time period. However, the present exemplary embodiment is not limited thereto. Lengths of the first time period and the second time period may be the same. For example, since the light source 110 emits light to the second region 12 that is a region of the object 10, an amount of the emitted light may be greater than the reference amount of light. The second time period may be less than the reciprocal of the reference frame rate of the image sensor 122. A method performed by the light source 110 to emit light to the second region 12 of the object 10 is the same as a method performed by the light source 110 to emit light to the first region 11 of the object 10, and thus a detailed explanation thereof will not be given.

In operation S230, the image obtainer 120 may obtain a first partial depth image by using light reflected from the first region 11. Light emitted to the first region 11 of the object 10 is reflected from a surface of the object 10 to the lens 140. In general, the first region 11 of the object 10 may have a plurality of surfaces that have distances, that is, depths, from the apparatus 100 are different from one another. For example, first light may be reflected from a surface of the first region 11 of the object 10 to generate a first reflected light, second light may be reflected from a surface of the first region 11 to generate a second reflected light, and likewise, an nth light may be reflected from a surface of the first region 11 of the object 10 to generate an nth reflected light.

The lens 140 focuses reflected light within a region of the image sensor 122. The filter 150 may be disposed between the lens 140 and the image sensor 122, and may pass light within a predetermined wavelength region (e.g., light within a wavelength region of interest) and filter out light out of the predetermined wavelength region (e.g., external light such as background light). For example, when the light source 110 emits light having a NIR wavelength of about 850 nm, the filter 150 may be an infrared (IR) band-pass filter through which light in a NIR wavelength band of about 850 nm passes. Accordingly, light incident on the image sensor 122 mainly includes light emitted from the light source 110 and reflected from the first region 11 of the object 10, and also includes external light. Although the filter 150 is disposed between the lens 140 and the image sensor 122 in FIG. 1, positions of the lens 140 and the filter 150 may be switched with each other. For example, NIR light having passed through the filter 150 may be focused on the image sensor 122 by the lens 140.

Next, the image sensor 122 modulates reflected light into a light modulation signal with a predetermined waveform. A period of a gain waveform of the image sensor 122 may be the same as a period of a waveform of light. In FIG. 1, the image sensor 122 may modulate the first reflected light reflected from the surface of the first region 11 of the object 10, and then may sequentially modulate the second reflected light through the nth reflected light. An amplitude of each reflected light may be modulated by an amount obtained by multiplying the reflected light by the light modulation signal. A period of the light modulation signal is the same of that of reflected light.

The image sensor 122 may obtain an image of each reflected light by receiving light that has an amplitude modulated for a predetermined period of time. For example, the image sensor 122 obtains a first partial image by receiving the first reflected light reflected from the surface of the first region 11 and then modulated for a predetermined exposure time. An image obtained by the image sensor 122 is an image of a region of the object 10, and thus is referred to as a partial image. Next, the image sensor 122 obtains a second partial image by receiving the second reflected light reflected from the surface of the first region 11 and then modulated for a predetermined exposure time. By repeatedly performing the above process, the image sensor 122 obtains an nth partial image by receiving the nth reflected light reflected from the surface of the first region 1 and then modulated for a predetermined exposure time. The image sensor 122 may sequentially obtain n different partial images in this manner. The first through nth partial images may be sub-frame images for forming an image having depth information. The n different partial images may have different phases. n may denote a positive integer.

A method of obtaining n different partial images by using n different pieces of light has been described. However, n different partial images may be obtained by using the same light and allowing the image sensor 122 to modulate a plurality of pieces of reflected light into signals with different gain waveforms.

For example, the image sensor 122 modulates reflected light into a first light modulation signal, modulates reflected light into a second light modulation signal that is different from the first light modulation signal, and modulates reflected light into an nth light modulation signal that are different from the first and second light modulation signals. The first through nth light modulation signals may be signals with different waveforms, or may be signals with the same period, the same waveform, and different phases. Accordingly, the image sensor 122 may obtain n differential partial images.

A plurality of partial images may have different phases due to modulation of light or reflected light. When there are n partial images, a phase difference between adjacent partial images may be 360°/n. For example, the image sensor 122 may obtain four partial images with phases of 0°, 90°, 180°, and 270°. However, the present exemplary embodiment is not limited thereto, and two or more partial images may be obtained.

The processor 124 may obtain a first partial depth image having depth information of the object 10 by using the plurality of partial images of the first region 11. For example, assuming that depth information for a partial depth image is obtained by using four partial images with different phases, the processor 124 may obtain the first partial depth image having depth information as shown in Equation 1.

$$\text{Depth} = \tan^{-1}\left(\frac{I2 - I4}{I1 - I3}\right) \times R_{max} \qquad \text{[Equation 1]}$$

In Equation 1, $R_{max}$ is a maximum distance of the object 10 captured by the apparatus 10 according to an exemplary embodiment and is determined by a speed of light and a modulation frequency of the light, and I1, I2, I3, and I4 are first through fourth partial images.

In operation S240, the image obtainer 120 may obtain a second partial depth image by using light reflected from the second region 12. A method of obtaining the second partial depth image is the same as a method of obtaining the first partial depth image, and thus a detailed explanation thereof will not be given.

In operation S250, the image obtainer 120 may obtain a first depth image of the object 10 by using the first and second partial depth images. The image obtainer 120 may obtain the first depth image by combining the first and second partial depth images based on coordinate information of pixels. Since the object 10 is divided into a plurality of regions and a depth image is obtained from partial depth images as described above, motion blur may be reduced.

Figure 3:
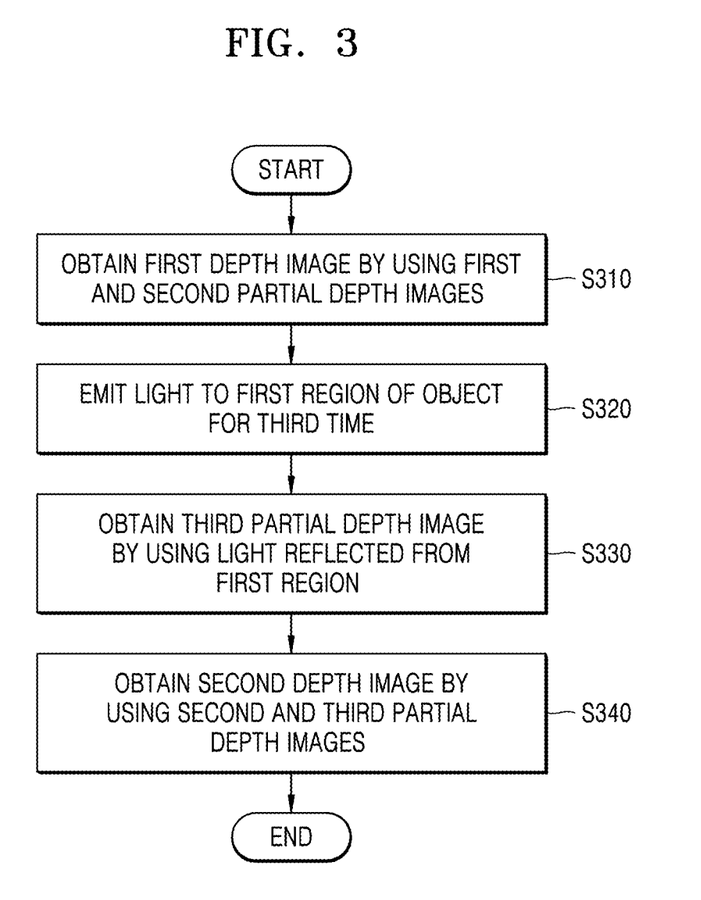
FIG. 3 is a flowchart of a method of obtaining a plurality of depth images, according to an exemplary embodiment.

FIG. 3 is a flowchart of a method of obtaining a plurality of depth images according to an exemplary embodiment. Referring to FIG. 3, in operation S310, the image obtainer 120 may obtain a first depth image by using first and second partial depth images. A method of obtaining the first depth image has been described above, and thus an explanation thereof will not be given.

In operation S320, the light source 110 may emit light to the first region 11 of the object 10 for a third time period. When the light source 110 includes the first and second light sources 112 and 114, the first light source 112 may emit light to the first region 11 of the object 10. However, the present exemplary embodiment is not limited thereto. The light source 110 may emit light to the first region 11 of the object 10 by changing an illumination angle.

At least parts of the third time period and the second time period may not overlap each other. For example, the third time period may be a time interval subsequent to the second time period. However, the present exemplary embodiment is not limited thereto. The third time period may be a time after a predetermined period of time elapses from the second time period. Lengths of the third time period and the second time period or the first time period may be the same. That is, the third time period may be less than the reciprocal of the reference frame rate of the image sensor 122. This is because only some pixels of the image sensor 122 have to receive light.

An amount of the light emitted to the first region 11 for the third time period may be greater than the reference amount of light, and may be the same as an amount of the light emitted to the first region for the first time period or an amount of the light emitted to the second region 12 for the second time period. The amount of the light emitted for the third time period may be a value obtained by multiplying a ratio of the object 10 to the first region 11 by the reference amount of light. For example, when the first region 11 is ½ of the object 10, an amount of the light emitted for the third time period may be two times greater than the reference amount of light.

In operation S330, the image obtainer 120 may obtain a third partial depth image by using light reflected from the first region 11 for the third time period. In detail, the image sensor 122 may obtain a plurality of partial images. For example, the plurality of partial images may be four partial images I1, I2, I3, and I4 with phases of 0°, 90°, 180°, and 270°. However, the present exemplary embodiment is not limited thereto. The processor 124 may obtain the third partial depth image by using the four partial images. A method of obtaining the third partial depth image is the same as a method of obtaining the first partial depth image, and thus a detailed explanation thereof will not be given.

In operation S340, the processor 124 may obtain a second depth image of the object 10 by using the second and third partial depth images. Since the second partial depth image that is previously obtained and the third partial depth image that is newly obtained are combined with each other in order to obtain the second depth image, a frame rate of a depth image may be less than a reference frame rate of the image sensor 122. For example, when the reference frame rate of the image sensor 122 is 60 frames per second (fps), although ¹⁄₆₀ seconds is taken to obtain an initial depth image, a frame rate of a next depth image may be 30 fps because a partial depth image is previously obtained and is used for the next depth image. Also, since a depth image is obtained by using a partial depth image, motion blur may be reduced.

Figure 4:
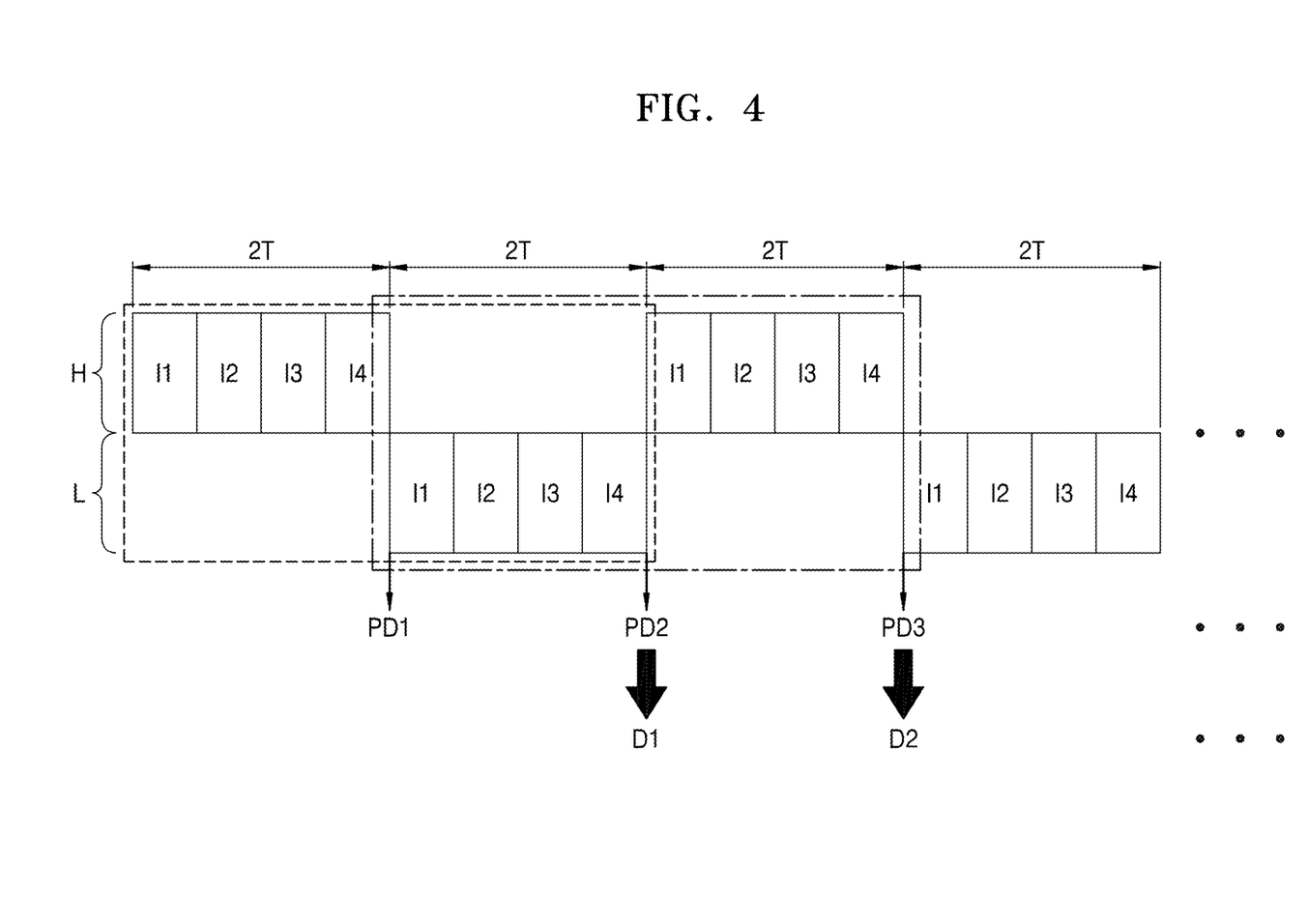
FIG. 4 is a reference diagram for explaining a method of obtaining a depth image, according to an exemplary embodiment.

FIG. 4 is a reference diagram for explaining a method of obtaining a depth image according to an exemplary embodiment. For convenience of explanation, the object 10 may be divided into an upper region H and a lower region L, and the light source 110 may alternately emit a plurality of pieces of light to the upper region H and the lower region L. The plurality of pieces of light may have predetermined periods and predetermined waveforms and may be different from one another. The light source 110 may continuously and sequentially emit the plurality of pieces of light. For example, the light source 110 may emit the plurality of pieces of light with the different phases, for example, four pieces of light whose phase difference between adjacent pieces of light is 90°, to the upper region H of the object 10 for a first time period and may emit four pieces of light with different phases to the lower region L of the object 10 for a second time period. Continuously, the light source 110 may alternately emit light to the upper region H and the lower region L.

The image obtainer 120 may be synchronized with the light source 110 according to a control signal of the controller 130. Accordingly, the image sensor 122 may obtain partial images I1, I2, I3, and I4 with phases of 0°, 90°, 180°, and 270° for the upper region H of the object 10 for the first time period. When T is a reciprocal of a frame rate of the image sensor 122, the image sensor 122 may obtain each partial image in every time interval of T/2. Accordingly, the image sensor 122 may obtain four partial images for the first time period, that is, from 0 to 2T.

The processor 124 may obtain a first partial depth image PD1 of the upper region H of the object 10 by using the four partial images I1, I2, I3, and I4. Next, the image sensor 122 may obtain partial images I1, I2, I3, and I4 with phases of 0°, 90°, 180°, and 270° for the lower region L of the object 10 for the second time period, for example, from 2T to 4T. The processor 124 may obtain a second partial depth image PD2 of the lower region L of the object 10 by using the four partial images I1, I2, I3, and I4.

Next, after the first and second time periods elapse, the processor 124 may obtain a first depth image D1 of the object 10 by using the first partial depth image PD1 of the upper region H and the second partial depth image PD2 of the lower region L.

By using the same method, the light source 110 may emit a plurality of pieces of light with different phases to the upper region H of the object 10 for a third time period, for example, from 4T to 6T. The image sensor 122 may obtain partial images I1, I2, I3, and I4 with phases of 0°, 90°, 180°, and 270° for the upper region H of the object 10 by being synchronized with the light source 110. The processor 124 may obtain a third partial depth image PD3 of the upper region H of the object 10 by using the four partial images I1, I2, I3, and I4. The processor 124 may obtain a second depth image D2 of the object 10 by combining the second partial depth image PD2 of the lower region L and the third partial depth image PD3 of the upper region H.

Figure 5:
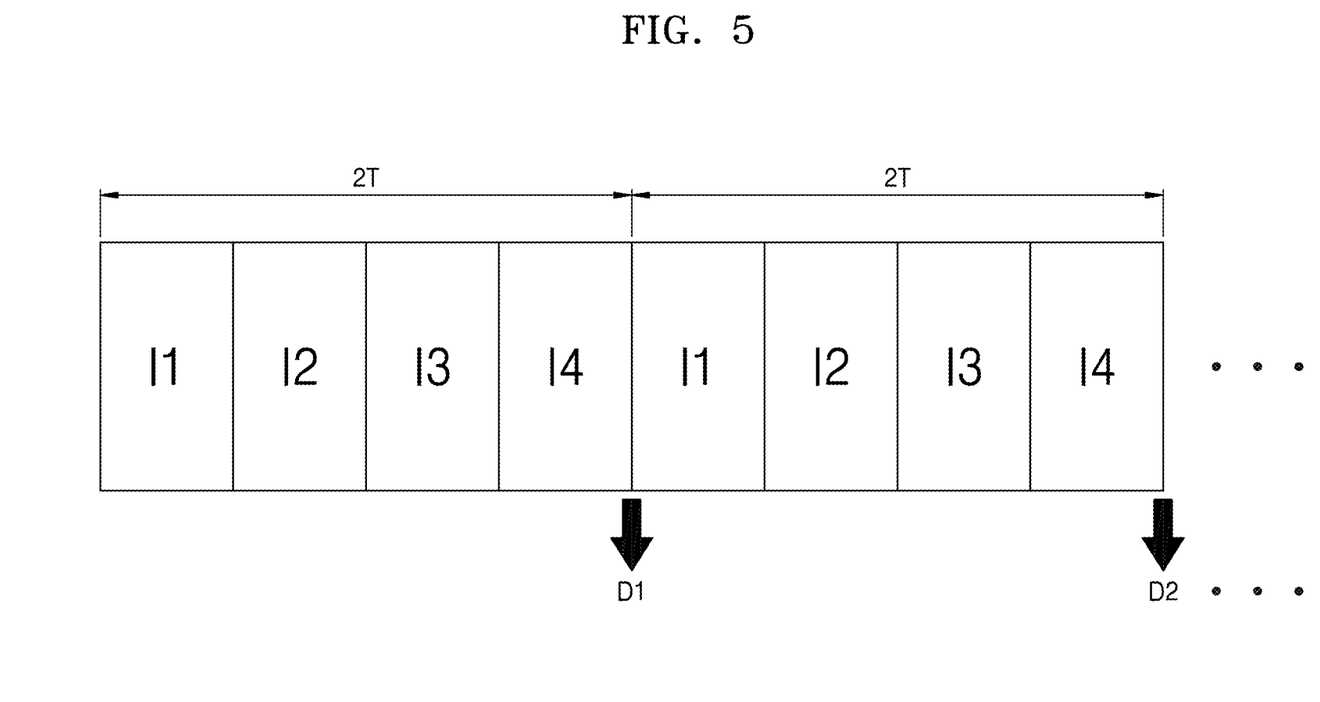
FIG. 5 is a reference diagram for explaining a method of obtaining a depth image after an image sensor obtains an image of an entire object, as a comparative example.

FIG. 5 is a reference diagram for explaining a method performed by the image sensor 122 to obtain a depth image after obtaining an image of the entire object 10 according to a comparative example. When a reference frame rate of the image sensor 122 is 60 fps, as shown in FIG. 5, the image sensor 122 may obtain an image every ⅟60 seconds, and may obtain a depth image by using four images after ⅟50 seconds. Accordingly, a frame rate of the depth image is 15 fps.

When FIGS. 4 and 5 are compared with each other, a frame rate of any of depth images sequent to a second depth image of FIG. 4 is less than that of FIG. 5. This is because a partial depth image that is previously obtained and a partial depth image that is newly obtained are used. Even in FIG. 5, a depth image subsequent a second depth image may be obtained by using an image that is previously obtained, that is, an image obtained from 0 to 4T and an image that is newly obtained, that is, an image obtained from 4T to 5T. However, in this case, a lot of noise is included in the depth image, thereby making it difficult to obtain depth information.

Figure 6A:
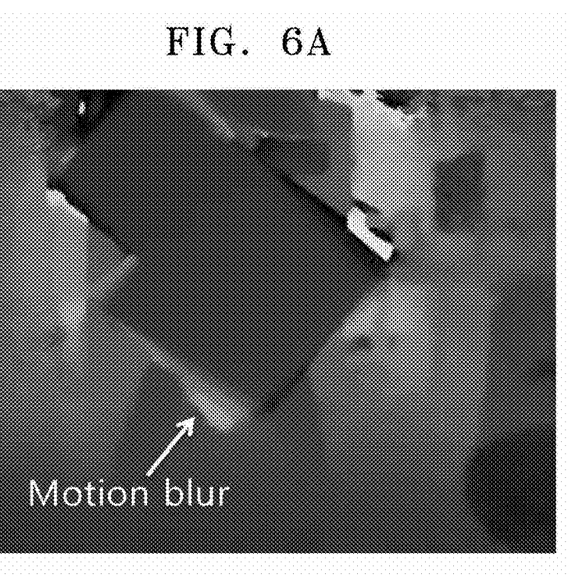
FIG. 6A shows a depth image obtained by using the method of FIG. 5.

FIG. 6A shows a depth image obtained by using the method of FIG. 5.

Figure 6B:
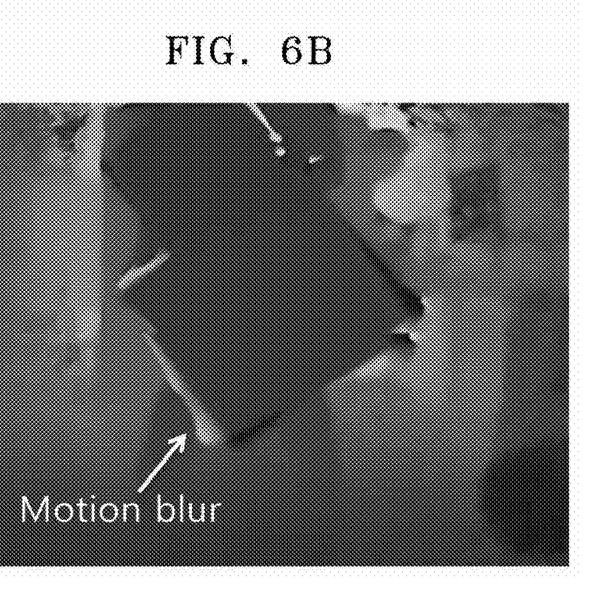
FIG. 6B shows a depth image obtained by using the method of FIG. 4.

FIG. 6B shows a depth image obtained by using the method of FIG. 4. As shown in FIGS. 6A and 6B, motion blur in FIG. 6B is less than motion blur in FIG. 6A.

Although the object 10 is divided into two regions and the image obtainer 120 is synchronized with the light source 110 and obtains upper and lower partial depth images in FIG. 4, the present exemplary embodiment is not limited thereto. The apparatus 100 according to an exemplary embodiment may divide the object 10 into three or more regions and the image obtainer 120 may obtain three or more partial depth images of the object 10.

Figure 7:
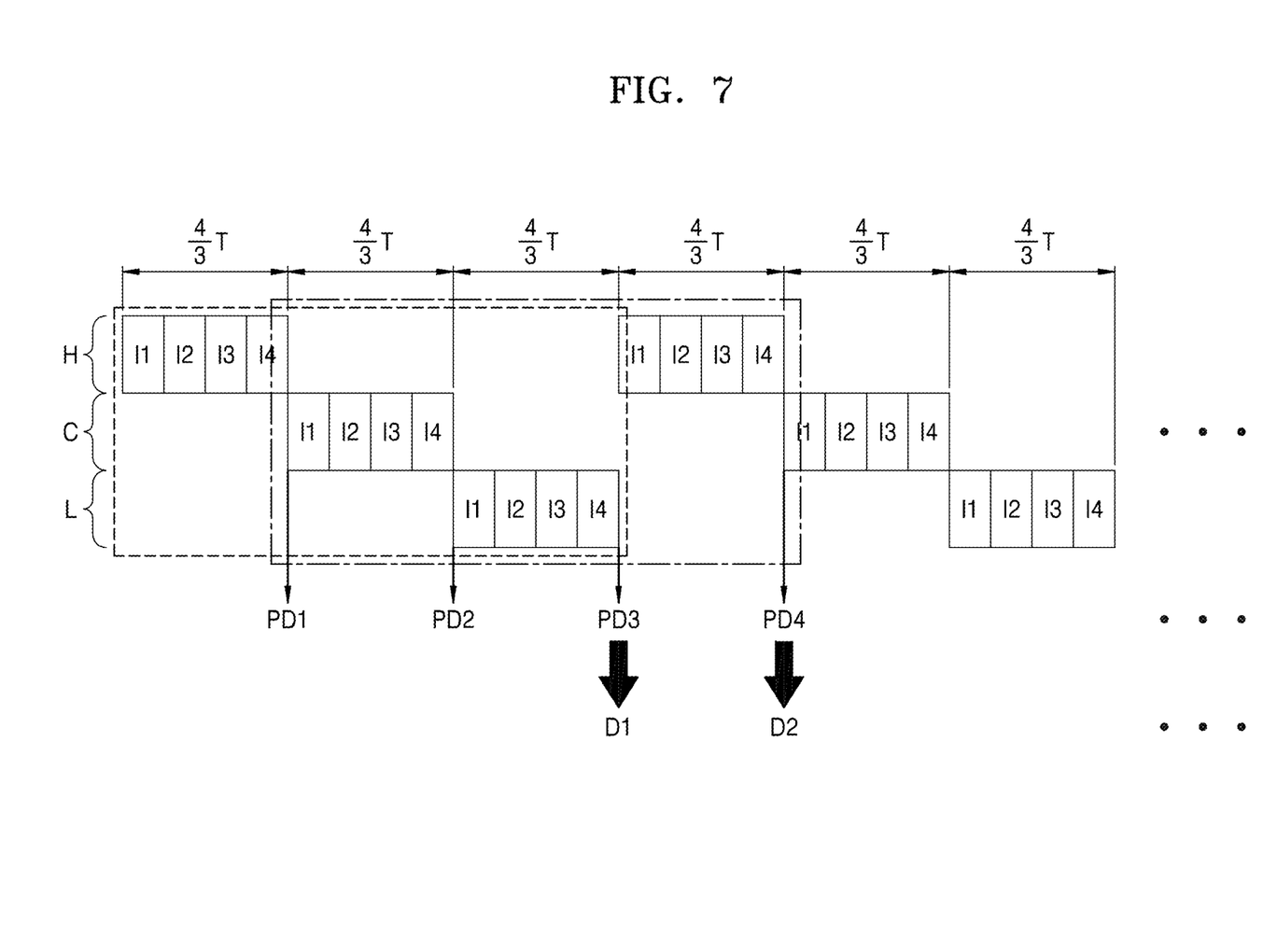
FIG. 7 is a reference diagram for explaining a method of obtaining a depth image, according to another exemplary embodiment.

FIG. 7 is a reference diagram for explaining a method of obtaining a depth image according to another exemplary embodiment. Referring to FIG. 7, the light source 110 may divide the object 10 into an upper region H, a central region, C, and a lower region L, and may sequentially emit a plurality of pieces of light to the upper region H through the lower region L. An amount of light of the light source 110 may be three times greater than a reference amount of light.

Also, the image obtainer 120 may obtain a partial image at a speed that is three times higher than a reference frame rate. For example, the processor 124 may obtain a first partial depth image PD1 by using a partial image obtained from 0 to 4T/3, may obtain a second partial depth image PD2 by using a partial image obtained from 4T/3 to 8T/3, and may obtain a third partial depth image PD3 by using a partial image obtained from 8T/3 to 4T. Accordingly, the processor 124 may obtain a first depth image D1 by combining the first through third partial depth images PD1, PD2, and PD3. Also, the image obtainer 120 may obtain a fourth partial depth image PD4 of the upper region H of the object from 4T to 4T+4T/3 and may obtain a second depth image D2 by combining the second through fourth partial depth images PD2, PD3, and PD4.

When the object 10 is divided into three regions and then each partial depth image is obtained, motion blur may be further reduced and a frame rate of a depth image may be further improved. Alternatively, the object 10 may be divided into four or more regions.

The object 10 has been vertically divided. However, the present exemplary embodiment is not limited thereto. The object 10 may be horizontally divided, and the image sensor 122 may be horizontally synchronized. The object 10 may be divided in other directions.

Also, the apparatus 100 may divide the object 10 into a plurality of regions and may discontinuously emit light to the plurality of regions. The image obtainer 120 may be synchronized with the light source 110 and may obtain a partial image only when light is emitted to a region of the object 10. As described above, the light source 110 and the image sensor 122 may be synchronized with each other to emit light for a predetermined period of time, and the image sensor 122 may operate for the predetermined period of time to modulate reflected light. Since the image sensor 122 does not operate for a period of time for which light is not emitted to maintain light reception at a minimum level, the image sensor 122 may be prevented from receiving external light. A ratio of a time for which light is emitted to a time for which light is not emitted may be referred to as a duty ratio. When the duty ratio is less than 100%, it may mean that light is discontinuously emitted.

Figure 8A:
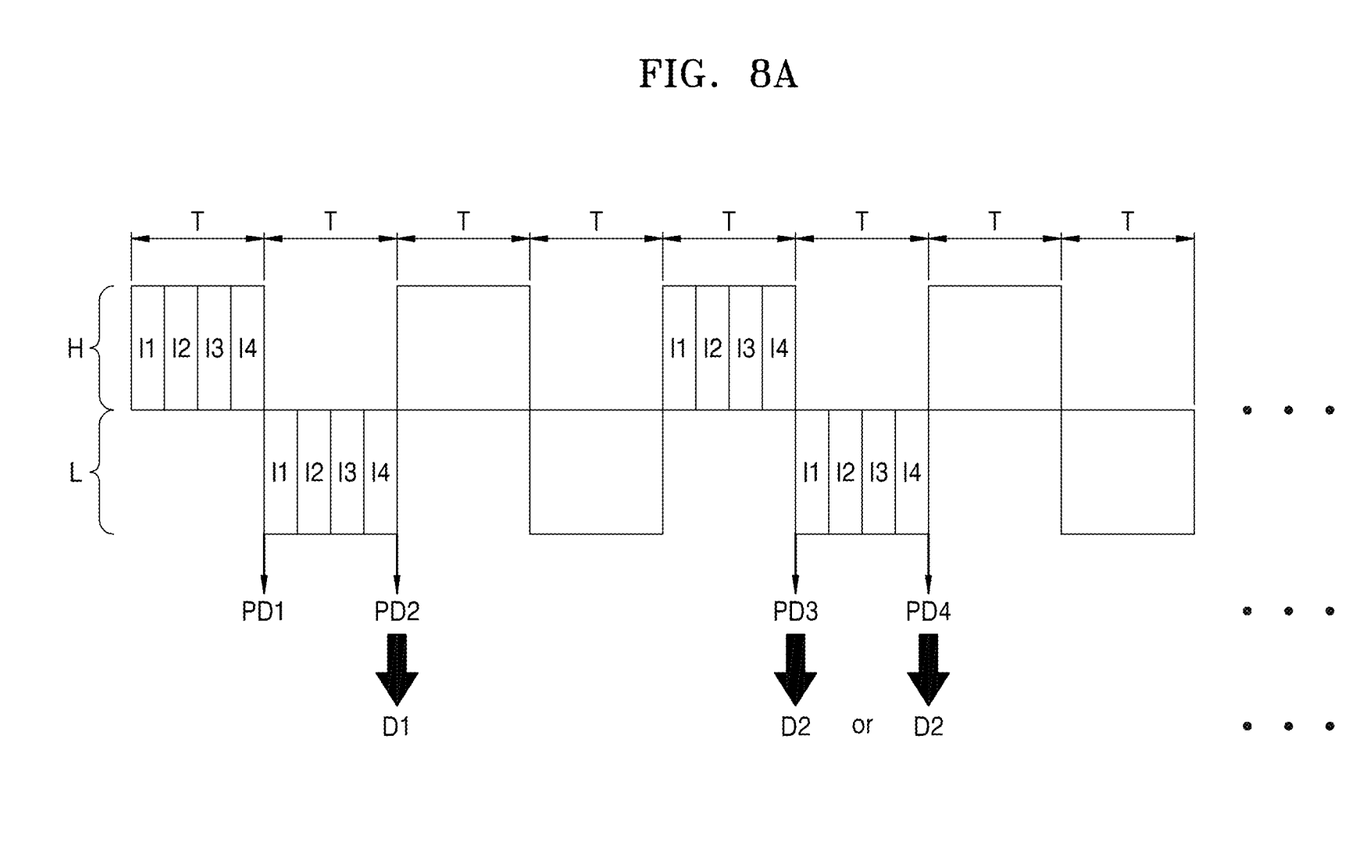
FIGS. 8A and 8B are diagrams for explaining a method of obtaining a depth image when a duty ratio is 50%, according to another exemplary embodiment.
Figure 8B:
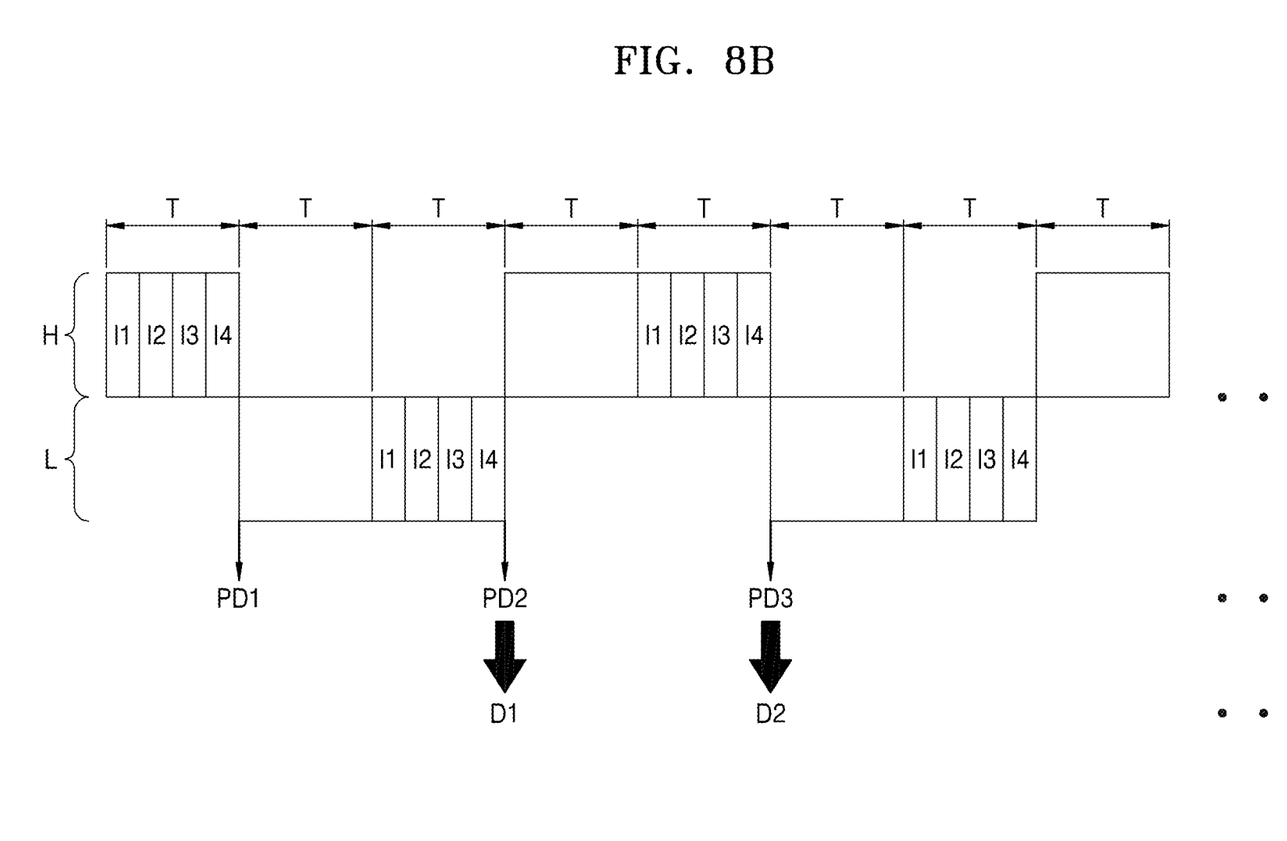

FIGS. 8A and 8B are diagrams for explaining a method of obtaining a depth image when a duty ratio is 50% according to another exemplary embodiment. Referring to FIG. 8A, the light source 110 may emit light to the object 10 for 2T from among 4T. For example, the light source 110 may emit four different pieces of light to the upper region H of the object 10 from 0 to T, and may emit four different pieces of light to the lower region L of the object 10 from T to 2T. An amount of each light emitted to the object 10 may be four times greater than the reference amount of light. This is because a duty ratio is 50% and light is emitted to only a ½ region of the object 10. When light is discontinuously emitted in this manner, external light may be reduced.

Although light is emitted to the upper region H of the object 10 from 0 to T, light is emitted to the lower region L of the object from T to 2T, and light is not emitted from 2T to 4T in FIG. 8A, the present exemplary embodiment is not limited thereto. As shown in FIG. 8B, light may be emitted to the upper region H of the object 10 from 0 to T and light may be emitted to the lower region L from 2T to 3T, and light may not be emitted to the object 10 from T to 2T and from 3T to 4T. As shown in FIG. 8B, since light is discontinuously emitted to a region of the object 10, external light and motion blur may be reduced and a frame rate of a depth image may be improved. Although the object 10 is divided into two regions in FIGS. 8A and 8B, the present exemplary embodiment is not limited thereto.

While not restricted thereto, an exemplary embodiment can be embodied as computer-readable code on a computer-readable recording medium. The computer-readable recording medium is any data storage device that can store data that can be thereafter read by a computer system. Examples of the non-transitory computer-readable recording medium include magnetic storage media (e.g., ROM, floppy disks, hard disks, etc.), optical recording media (e.g., CD-ROMs, or DVDs), etc. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An apparatus for obtaining an image, the apparatus comprising:
    a light source configured to emit first light to a first region of an object for a first time period without illuminating the object other than the first region, emit second light to a second region of the object for a second time period, without illuminating the object other than the second region, and emit third light to the first region of the object for a third time period, without illuminating the object other than the first region;
    an image sensor configured to be synchronized with the light source, obtain a plurality of first partial images based on the first light reflected from the first region and a plurality of third partial images based on the third light reflected from the first region, through a region of the image sensor corresponding to the first region, and obtain a plurality of second partial images based on the second light reflected from the second region, through a region of the image sensor corresponding to the second region; and
    a processor configured to obtain a first partial depth image comprising depth information based on the first light reflected from the first region, obtain a second partial depth image based on the second light reflected from the second region, obtain a third partial depth image based on the third light reflected from the first region, obtain a first full depth image of the object based on the first partial depth image and the second partial depth image, at a first image processing time after the first time period and the second time period, and obtain a second full depth image of the object based on the second partial depth image and the third partial depth image, at a second image processing time after the first time period, the second time period, and the third time period,
    wherein the second partial depth image is used for both the first full depth image obtained at the first image processing time and the second full depth image obtained at the second image processing time, and frame rates of the first full depth image and the second full depth image are equal to frame rates of the first partial depth image, the second partial depth image, and the third partial depth image, and
    wherein the first time period, the second time period, and the third time period are different from each other, and
    wherein the image sensor is further configured to modulate a plurality of pieces of the first light into signals with different gain waveforms.

2. The apparatus of claim 1, wherein the light source is further configured to emit the first light only to the first region of the object for the first time period and emit the second light only to the second region of the object for the second time period, so that the first light is reflected only from the first region and the second light is reflected only from the second region, and
    wherein the image sensor is further configured to obtain the first full depth image by combining the first partial depth image based on the first light reflected only from the first region with the second partial depth image based on the second light reflected only from the second region.

3. The apparatus of claim 1, wherein the second time period is subsequent to the first time period, and the first time period does not overlap with the second time period.

4. The apparatus of claim 1, wherein the first time period is less than a reciprocal of a reference frame rate of the image sensor.

5. The apparatus of claim 1, wherein the first time period is less than or equal to a value obtained by multiplying a ratio of a size of the first region to a size of the object by a reciprocal of a reference frame rate.

6. The apparatus of claim 1, wherein an amount of the first light emitted to the first region per unit area of the first region, is greater than a reference amount of light that is set to be emitted to an entire region of the object per unit area of the entire region of the object.

7. The apparatus of claim 1, wherein at least parts of the first region and the second region do not overlap each other.

8. The apparatus of claim 7, wherein the first region is an upper region of the object, and the second region is a lower region of the object.

9. The apparatus of claim 1, wherein the first light emitted from the light source comprises a plurality of pieces of light with different phases.

10. The apparatus of claim 9, wherein a phase difference between adjacent two pieces of light from among the plurality of pieces of light is 90°.

11. The apparatus of claim 1, wherein the first partial depth image is obtained from a plurality of partial images with different phases.

12. The apparatus of claim 1, wherein at least parts of the second time period and the third time period do not overlap each other.

13. The apparatus of claim 12, wherein the third time period is subsequent to the second time period.

14. The apparatus of claim 13, wherein a time interval exists between the second time period and the third time period.

15. A method of obtaining an image, the method comprising:
- emitting first light to a first region of an object for a first time period, without illuminating the object other than the first region;
- emitting second light to a second region of the object for a second time period, without illuminating the object other than the second region;
- emitting third light to the first region of the object for a third time period, without illuminating the object other than the first region;
- obtaining a first partial depth image based on the first light reflected from the first region and received by an image sensor, the image sensor being configured to modulate a plurality of pieces of the first light into signals with different gain waveforms;
- obtaining a second partial depth image based on the second light reflected from the second region and received by the image sensor;
- obtaining a third partial depth image based on the third light reflected from the first region and received by the image sensor;
- obtaining a first full depth image of the object based on the first partial depth image and the second partial depth image, at a first image processing time after the first time period and the second time period;
- obtaining a second full depth image of the object based on the second partial depth image and the third partial depth image, at a second image processing time after the first time period, the second time period, and the third time period,
- wherein the second partial depth image is used for both the first full depth image obtained at the first image processing time and the second full depth image obtained at the second image processing time, and frame rates of the first full depth image and the second full depth image are equal to frame rates of the first partial depth image, the second partial depth image, and the third partial depth image, and
- wherein the first time period, the second time period, and the third time period are different from each other.

16. The method of claim 15, wherein the emitting the first light comprises emitting the first light only to the first region of the object for the first time period, the emitting the second light comprises emitting the second light only to the second region of the object for the second time period, the obtaining the first full depth image comprises combining the first partial depth image based on the first light reflected only from the first region with the second partial depth image based on the second light reflected only from the second region.

17. The method of claim 15, wherein the second time period is subsequent to the first time period, and the first time period does not overlap with the second time period.

18. The method of claim 15, wherein the first time period is less than a reciprocal of a reference frame rate of the image sensor configured to receive the first light and the second light.

19. The method of claim 18, wherein the first time period is less than or equal to a value obtained by multiplying a ratio of a size of the first region to a size of the object by the reciprocal of the reference frame rate.

20. The method of claim 15, wherein an amount of the first light emitted to the first region per unit area of the first region, is greater than a reference amount of light that is set to be emitted to an entire region of the object per unit area of the entire region of the object.

21. The method of claim 15, wherein at least parts of the first region and the second region do not overlap each other.

22. The method of claim 21, wherein the first region is an upper region of the object and the second region is a lower region of the object.

23. The method of claim 15, wherein the emitting the first light comprises emitting a plurality of pieces of the first light to the first region, and the plurality of pieces of the first light have different phases from each other.

24. The method of claim 23, wherein a phase difference between adjacent two pieces of light from among the plurality of pieces of the first light is 90°.

25. The method of claim 15, wherein at least parts of the second time period and the third time period do not overlap each other.

26. The method of claim 25, wherein the third time period is subsequent to the second time period.

27. The method of claim 25, wherein a time interval exists between the second time period and the third time period.

* * * * *